United States Patent Office 2,718,237
Patented Sept. 20, 1955

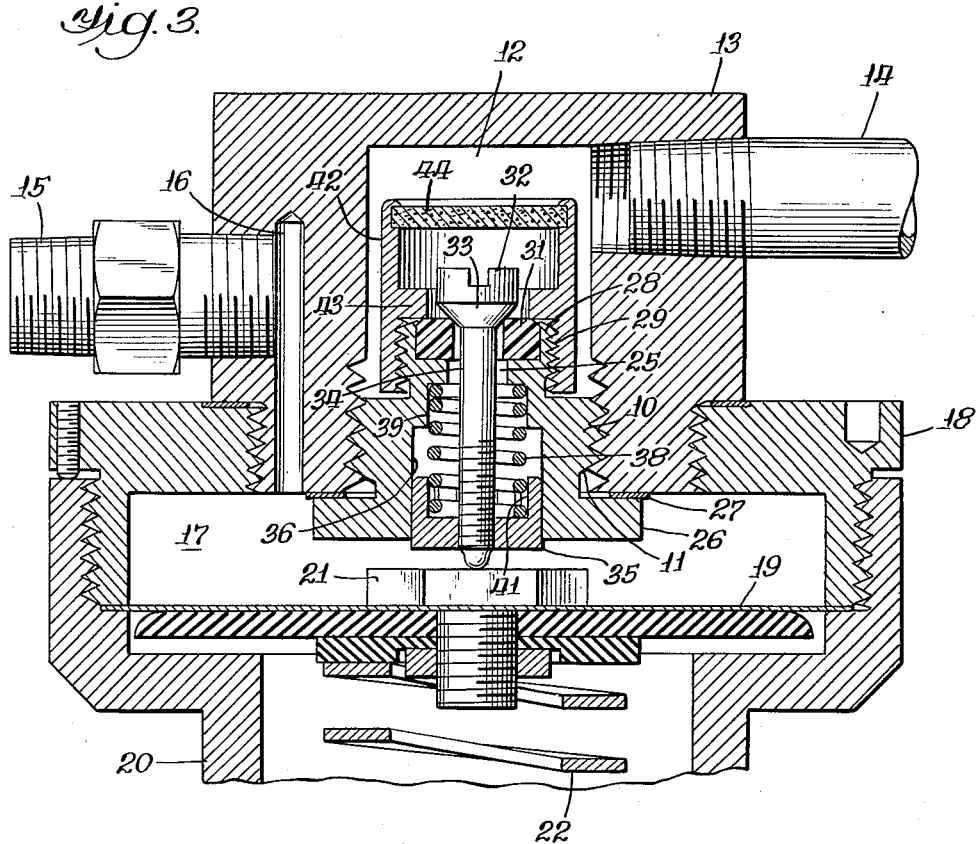
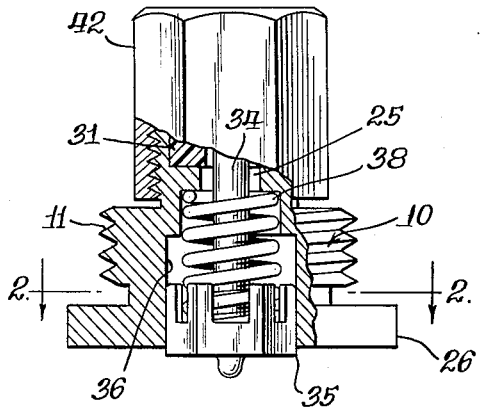
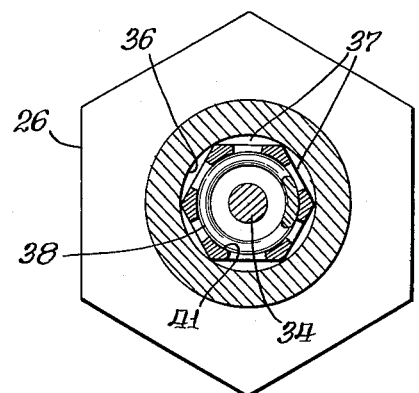

2,718,237

HIGH PRESSURE VALVE ASSEMBLY

John L. Matasovic, Chicago, Ill.

Application December 14, 1953, Serial No. 397,925

4 Claims. (Cl. 137—505.37)

This invention relates to pressure regulators, and the present specification is a continuation-in-part of my prior copending applications Ser. No. 29,183, filed May 3, 1948, now Patent No. 2,666,278 of January 19, 1954, and Ser. No. 261,205, filed December 12, 1951.

It is the general aim of the invention to provide pressure regulators with a high pressure valve and filter assembly which is removable from the regulator as a self-contained, enclosed, dustproof unit, so that particles of dust, scale or other foreign material will be prevented from lodging upon the valve or valve seat in such a way as to cause leakage of gas therethrough, even though the regulator be dismantled in locations where dust is prevalent. A further aim is to provide such a valve assembly wherein the operating parts of the valve are so designed and so positioned with respect to each other and with respect to the direction of flow of gas therethrough as to prevent particles of corrosion or scale which may accumulate on the valve closure spring from being carried into the seating surfaces of the valve.

The prior co-pending applications referred to above have disclosed pressure regulators having a unitary, self-contained valve and filter assembly which is adapted to be removed from the regulator as a unit, in order that the valve of the regulator may be conveniently replaced on the job. In the prior applications, however, the high pressure valve of the regulator was held in closed position by a coiled wire spring positioned on the inlet side; that is, between the filter of the protective cap and the sealing surfaces of the valve. Such an arrangement has shown itself to be entirely satisfactory for most applications, although it has been observed that under certain adverse conditions of operation the passage of certain gases through the regulator (highly compressed oxygen, for example), will in time cause a formation of a thin deposit of corrosion or scale upon the valve spring. It has also been observed that it is possible for the flexing of this spring to cause tiny particles of this scale or foreign material to break loose, or chip off. When this occurs, it is possible that these tiny particles of foreign matter may be carried to the valve, and may become lodged between its sealing surfaces, causing leakage.

It is a specific object of the present invention to overcome this fault. It is a further object of the invention to overcome the fault noted above, while at the same time maintaining the many advantages inherent in the constructions shown in my prior applications, particularly as to providing a small, compact, self-contained valve and filter assembly which is conveniently removable from the regulator as a unit, and wherein the parts are so arranged as to prevent foreign material from reaching the valve, even when the valve assembly is completeley removed from the regulator.

A preferred form of the invention is illustrated in the drawings of this specification, wherein:

Figure 1 is a side elevational view, partly in section, showing a unitary, high pressure valve and filter assembly as contemplated by this invention, adapted for use in connection with regulators of the types shown in my prior applications identified above;

Figure 2 is a detail sectional view through said high pressure valve assembly, the view being taken substantially on the plane of the line 2—2 of Figure 1; and Figure 3 is a fragmental central sectional view showing the high pressure valve assembly of the present invention in operating relationship with the other component parts of a pressure regulator.

The valve assembly of the present invention comprises a screw threaded plug 10 having external male screw threads 11 adapted to be received in mating threads within the high pressure cavity 12 of the body 13 of a pressure regulator. Such a regulator (illustrated more fully in my prior specifications), may include a gas inlet nipple 14 through which the high pressure gas enters the chamber 12, together with an outlet nipple 15 in communication with an outlet port 16 which leads from a low pressure gas chamber 17 formed within the diaphragm housing 18. The low pressure chamber is closed by a pressure sensitive diaphragm 19 clamped in position by a hollow shell or cap 20, and the diaphragm is provided with a clamping nut 21 and pressure adjusting spring 22 in the manner well understood in the art.

The plug 10 includes a central gas passage 25 extending completely through the plug from its inlet or upper end, which is disposed within the high pressure chamber 12, to its outlet or lower end disposed within the low pressure chamber 17. The lower or outlet end of the plug is provided with an integral, outwardly extending, hexagonal flange or nut portion 26 whereby it may be threaded into the cavity 12 or removed therefrom, and, as shown, the nut portion has a flat upper face comprising a marginal sealing surface adapted to bear against the gasket 27 and thus seal the high pressure chamber 12.

The upper or inlet end of the plug 10 is provided with a projecting boss portion 28 having screw threads 29 of reduced diameter as compared with the screw threads 11. The boss 28 is also provided with an enlarged counterbore at the inlet end of the gas passage 25, and a nonmetallic valve seat 31 is mounted within said counterbore. If desired, the uppermost edges of the boss may be spun inwardly over the edges of the valve seat to hold it in position and effect an adequate seal therearound.

A poppet valve 32 is arranged with a conical tapered valve surface 33 to resiliently engage the valve seat 31 and close the inlet end of the gas passage 25. The valve is provided with a downwardly disposed stem portion 34 which extends entirely through the plug 10 and projects rrom the lower end thereof sufficiently to engage the clamping nut 21 of the pressure sensitive diaphragm 19, whereby movements of the diaphragm may open and close the valve. The lower end of the valve stem 34 is threaded into a hexagonal slide, or damping nut 35. The nut 35 is vertically slidable in an enlarged cylindrical counterbore 36 at the outlet end of the gas passage. Thus, while the nut 35 serves to hold the valve stem perfectly centered and in alignment with the valve seat 31, it permits vertical movement of the valve sufficient for opening and closing thereof, and permits adequate space for passage of the gas in the spaces 37 between the outer surfaces of the guide nut and the inside walls of the counterbore 36 (Figure 2). The valve is held closed by a helical coiled compression spring 38. This spring has its uppermost end seated in an intermediate counterbore 39 in the outlet portion of the gas passage through the plug, with its lower end seated in an oppositely disposed counterbore 41 in the upper surface of the guide nut 35.

The high pressure or inlet end of the plug 10 is entirely closed by a protective cover or cap 42. As shown, the cap is of hexagonal shape on its outer surfaces, to facilitate tightening it on the threads 29 of the boss 28, and it has an internal flange 43 which overhangs the outer edge of the valve seat and clamps the valve seat in position when the dust cap is tightened in place. The upper end of the cap is closed by a sintered metal filter 44 to prevent any dust, grit or foreign material entering the high pressure chamber 12 from reaching the valve or its seat.

It is to be noted that in this construction of the high pressure valve assembly, there are no moving parts whatsoever between the filter 44 and the valve 33. The coiled compression spring which holds the valve closed is below the seating surfaces of the valve and is thus on the downstream side of the valve. Thus, any scale or foreign matter which might accumulate on the spring and be dislodged by the flexing thereof cannot be carried between the critical sealing surfaces of the valve, but will pass harmlessly into the low pressure chamber and thence through the outlet port and discharge nipple of the regulator. It follows that with this arrangement the filter 44 provides almost perfect protection against any foreign particles reaching the critical surfaces of the valve, and as a result, there is little or no likelihood of such surfaces becoming fouled, scratched, or otherwise developing leaks.

Having thus described my invention, what I claim as new and desire to secure by United States Letters Patent is:

1. In a pressure regulator, a unitary high pressure valve and filter assembly consisting of a screw threaded plug with a gas inlet at one end, a gas outlet at the other end, and a gas passage extending therethrough from said inlet to said outlet; said plug having an enlarged nut and a sealing flange around its periphery at one end adjacent the gas outlet, and having an integral, externally threaded, reduced diameter boss at the other end adjacent the gas inlet; the gas passage having oppositely disposed, enlarged counterbores at its inlet and outlet ends; a nonmetallic valve seat mounted in the counterbore at the inlet end, a poppet valve having a head portion resiliently engaging said valve seat, a reduced diameter valve stem extending through the plug, and a threaded guide nut on the valve stem in sliding relationship within the enlarged counterbore at the outlet end of the gas passage, with a coil spring surrounding said valve stem and housed within a counterbore in the outlet side of said gas passage; said spring bearing against said guide nut and resiliently retaining said valve against said valve seat; with a protective cap secured directly to and wholly supported by the threaded boss of said plug; said cap entirely surrounding said valve seat and gas inlet and having an internal flange clamping said valve seat in the counterbore of the gas passage; with a filter portion in said cap adapted to admit gas to said valve.

2. In a pressure regulator, a unitary high pressure valve assembly consisting of a screw threaded plug with a gas inlet at one end, a gas outlet at the other end, and a gas passage extending therethrough from said inlet to said outlet; said plug having an enlarged nut and a sealing flange around its periphery at one end adjacent the gas outlet, the gas passage having oppositely disposed, enlarged counterbores at its inlet and outlet ends; a nonmetallic valve seat mounted in the counterbore at the inlet end, a poppet valve having a head portion resiliently engaging said valve seat, a reduced diameter valve stem extending through the plug, and a threaded guide nut on the valve stem in sliding relationship within the enlarged counterbore at the outlet end of the gas passage, with a coil spring surrounding said valve stem and housed within a counterbore in the outlet side of said gas passage; said spring bearing against said guide nut and resiliently retaining said valve against said valve seat.

3. In a pressure regulator, a unitary high pressure valve assembly consisting of a screw threaded plug with a gas inlet at one end, a gas outlet at the other end, and a gas passage extending therethrough from said inlet to said outlet; said plug having an enlarged nut and a sealing flange around its periphery at one end adjacent the gas outlet, a valve seat at the inlet end, a poppet valve having a head portion resiliently engaging said valve seat, a valve stem extending through the plug, with a spring in the outlet side of said gas passage resiliently retaining said valve against said valve seat.

4. In a pressure regulator, a unitary high pressure valve and filter assembly consisting of a plug with a gas inlet at one end, a gas outlet at the other end, and a gas passage extending therethrough from said inlet to said outlet; the gas passage having a valve seat at the inlet end, a poppet valve having a head portion resiliently engaging said valve seat, and a reduced diameter valve stem extending through the plug, with a coil spring surrounding said valve stem and housed in the outlet side of said gas passage; said spring resiliently retaining said valve against said valve seat; with a protective cap secured directly to and wholly supported by said plug; said cap entirely surrounding said valve seat and gas inlet, with a filter portion in said cap adapted to admit gas to said valve.

References Cited in the file of this patent

UNITED STATES PATENTS

| | | |
|---|---|---|
| 2,014,541 | Wappat | Sept. 17, 1935 |
| 2,106,971 | De Motte | Feb. 1, 1938 |
| 2,642,261 | Gates | June 16, 1953 |
| 2,666,278 | Matasovic | Jan. 19, 1954 |